Patented Nov. 28, 1922.

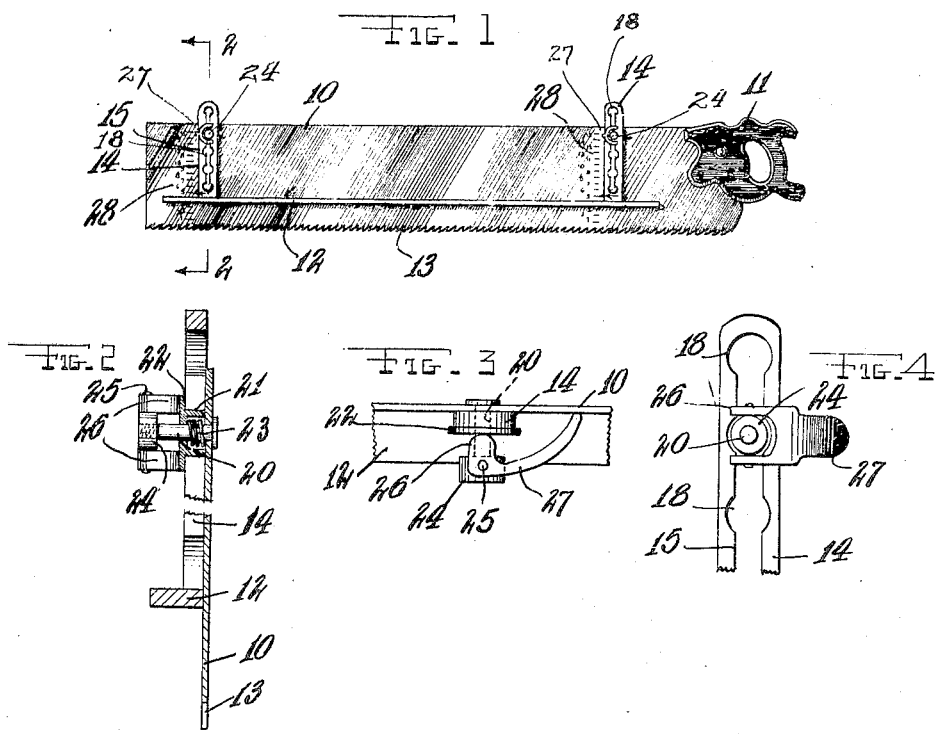

1,436,905

UNITED STATES PATENT OFFICE.

JOHN POLESKI AND JOZEF JURCAK, OF ST. CATHERINES, ONTARIO, CANADA.

DEPTH-CUTTING GAUGE ATTACHMENT FOR SAWS.

Application filed February 13, 1922. Serial No. 535,993.

*To all whom it may concern:*

Be it known that we, JOHN POLESKI and JOZEF JURCAK, citizens of Canada and Poland, respectively, residing at St. Catherines, Province of Ontario, Dominion of Canada, have invented certain new and useful Improvements in Depth-Cutting Gauge Attachments for Saws, of which the following is a specification.

This invention relates to an attachment for saws having particular reference to a gauge attachment for regulating the depth of cut of the saw in any object.

The invention has for an object to provide a simple and inexpensive gauge attachment for a saw by means of which the depth to which the saw will cut is regulated prior to the start of the cut, the necessity for removal of the saw, for measuring, or of working to any guide mark or marks on the object being cut, being thus avoided.

For further comprehension of the invention, and of the objects and advantages thereof, reference will be had to the following description and accompanying drawings, and to the appended claims in which the various novel features of the invention are more particularly set forth.

Fig. 1 of the drawings is a face view of a saw provided with our improved gauge attachment.

Fig. 2 is an enlarged transverse section on the line 2—2 of Fig. 1.

Fig. 3 is a fragmentary edge view.

Fig. 4 is a fragmentary face view showing the means for adjustably securing the gauge to the saw.

In the drawings we show at 10 a carpenter's saw of usual construction and having the usual handle 11. Our improved gauge comprises a straight metal bar 12 preferably of rectangular cross section which extends along one face of the saw parallel to the toothed edge 13 of the latter, this gauge bar being adjustable toward and away from said toothed edge.

In the construction shown in Figs. 1 to 4 of the drawings the gauge bar is provided near opposite ends with rigid upstanding fingers 14 which lie in flat contact with the face of the saw.

These fingers are formed with longitudinal slots 15 having circular enlargements 18 spaced therealong at measured distances. To clamp these fingers 14 to the saw we provide in connection with each one thereof a pin 20 fixed in the saw blade 10 and projecting through the slot 15. Slidably mounted on this pin is a washer 21 whose main body is of a thickness slightly less than the finger 14 and of a diameter to fit snugly in the enlargements 18, this washer having a radially projecting flange 22 at its outer end. A coiled spring 23, located in a recess in the washer 21 normally urges the same out of engagement with the enlargement 18.

Upon the end of the pin 20 is mounted a head 24 to which is pivoted as at 25 a clamping member comprising a pair of cams 26 fixed on an operating handle 27. These cam members bear on the flanged end 22 of the washer 21, the parts being preferably so arranged that the end of the handle 27 will be pressed against the saw blade when the cams are in locking position, as shown in Fig. 3.

For convenience in setting the gauge bar 12 to the desired distance from the toothed edge 13 we provide on the saw blade 10, near opposite ends thereof, the rows of marks 28 having adjacent numbers indicating distance in inches from the edge 13.

In the use of our improved attachment the fingers 14 are released by turning the clamp handles 27 outward, the springs 23 throwing the washers 21 out of the slot enlargements 18. The gauge bar 12 is then shifted to register with the proper marks 28 and the clamp handle swung inward, moving the washers 21 into the registering enlargements 18, the cams 26 bearing on the flanged end of the washer 21 and thus locking the parts together. The saw then will cut to the depth determined by the position of the gauge, and cut of even depth throughout its length is assured. The pin 20 may be held simply by frictional engagement in the saw blade 10 and may be readily knocked out and replaced on the opposite side if it is desired to change the attachment, the head 24 being here shown as threaded onto the pin 20 so that it may be readily removed and replaced.

Having thus described our invention what we claim as new and desire to protect by Letters Patent of the United States is as follows:

1. In combination with a sawblade, a gauge bar extending along said sawblade and having a pair of fingers extending rigidly upward therefrom, each of said fingers having a longitudinal slot formed with spaced enlargements, pins fixed in the sawblade and projecting through said slots, and washers freely surrounding said pins and adapted to fit snugly in any selected ones of said enlargements to hold the gauge bar in adjusted positions with respect to the toothed edge of the sawblade.

2. In combination with a sawblade, a gauge bar extending along said sawblade, and means for securing said bar to said blade at different distances from the toothed edge thereof, said means including a finger extending rigidly upward from said bar and provided with a longitudinal slot formed with spaced enlargements, a pin fixed in the saw blade and projecting through said slot, a washer surrounding said pin and fitting snugly in said enlargements and having a radial flange at its outer end, and a clamping element engaged with said pin and adapted to bear on the flanged end of the said washer.

3. In combination with a sawblade, a gauge bar extending along said sawblade, and means for securing said bar to said blade at different distances from the toothed edge thereof, said means including a finger extending rigidly upward from said bar and provided with a longitudinal slot formed with spaced enlargements, a pin fixed in the saw blade and projecting through said slot, a washer surrounding said pin and fitting snugly in said enlargements and having a radial flange at its outer end, and a clamping element engaged with said pin and adapted to bear on the flanged end of the said washer, said clamping element comprising a forked cam member pivoted on said pin and provided with an operating handle.

In testimony whereof we have affixed our signatures.

JOHN POLESKI.
JOZEF JURCAK.